C. I. HALL.
MAXIMUM DEMAND METER.
APPLICATION FILED MAR. 3, 1911.

1,145,835.

Patented July 6, 1915.
4 SHEETS—SHEET 1.

Witnesses:
Leonard W. Novander
George E. Higham

Inventor
Chester I. Hall
By Brown & Williams
Attorneys

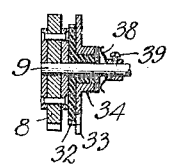
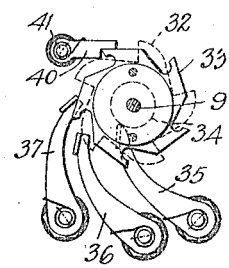
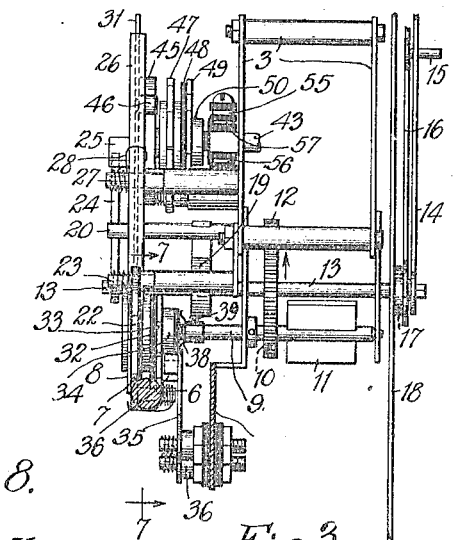
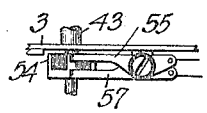
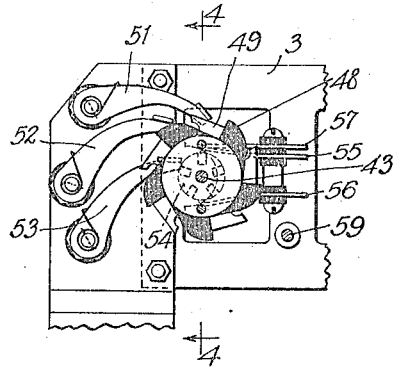
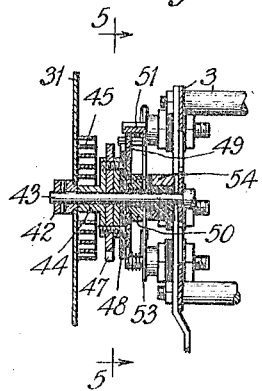

C. I. HALL.
MAXIMUM DEMAND METER.
APPLICATION FILED MAR. 3, 1911.

1,145,835.

Patented July 6, 1915.
4 SHEETS—SHEET 4.

Witnesses:
Leonard W. Novander
George C. Hipham

Inventor
Chester I. Hall
By Brown & Williams
Attorneys

UNITED STATES PATENT OFFICE.

CHESTER I. HALL, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

MAXIMUM-DEMAND METER.

1,145,835.   Specification of Letters Patent.   Patented July 6, 1915.

Application filed March 3, 1911. Serial No. 612,052.

*To all whom it may concern:*

Be it known that I, CHESTER I. HALL, a citizen of the United States, residing at Chicago, in the county of Cook and State of Illinois, have invented a certain new and Improved Maximum - Demand Meter, of which the following is a full, clear, concise, and exact description, reference being had to the accompanying drawings, forming a part of this specification.

My invention has for its object to indicate the maximum quantity of electric power used in any circuit during one of a succession of time intervals, as a result of which the meter indicates not only the maximum energy required during the interval, but also what may be called the average of the peaks of the load curve for the particular circuit. By my invention I also provide a construction which indicates the load in true watts whether the current be direct or alternating, and in the latter case whether the current and electromotive force be in phase or out of phase with each other.

In order to secure an indication which is a true average of the maximum demands made in the successive time intervals, I provide clock controlled mechanism for actually timing the intervals during which the mechanism of the indicator is operative and at the end of each interval the operating mechanism is returned to zero and again begins to move at a rate determined by the electrical consumption at that time. The operating mechanism controls a pointer which remains in the maximum position to which it is moved thus affording a visual indication of the maximum demand during any one of the time intervals, which demand, however, is generally not the maximum instantaneous demand value since the time intervals serve to interrupt the indication of the maximum instantaneous values and average the maximum demands for the different intervals.

Figure 1:
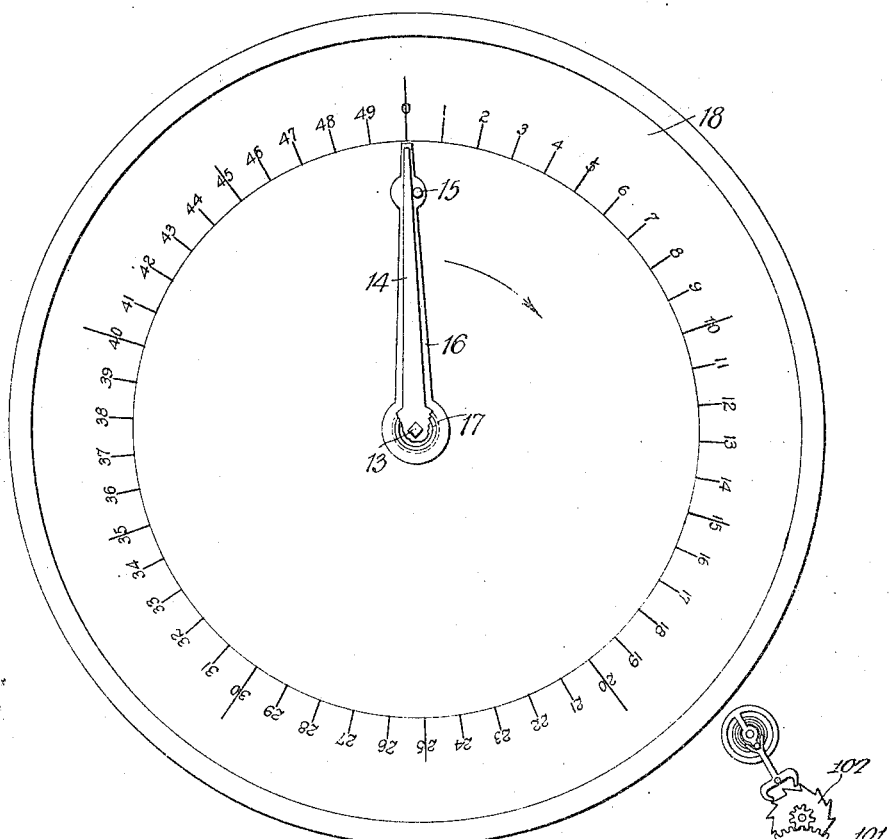
Figure 10:
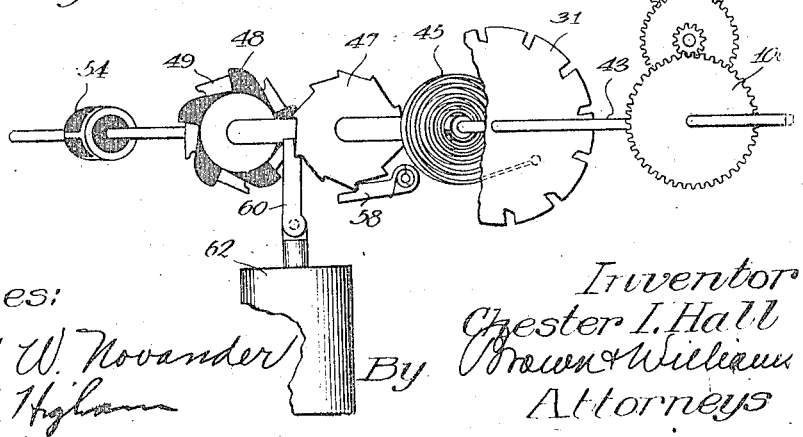
Figure 2:
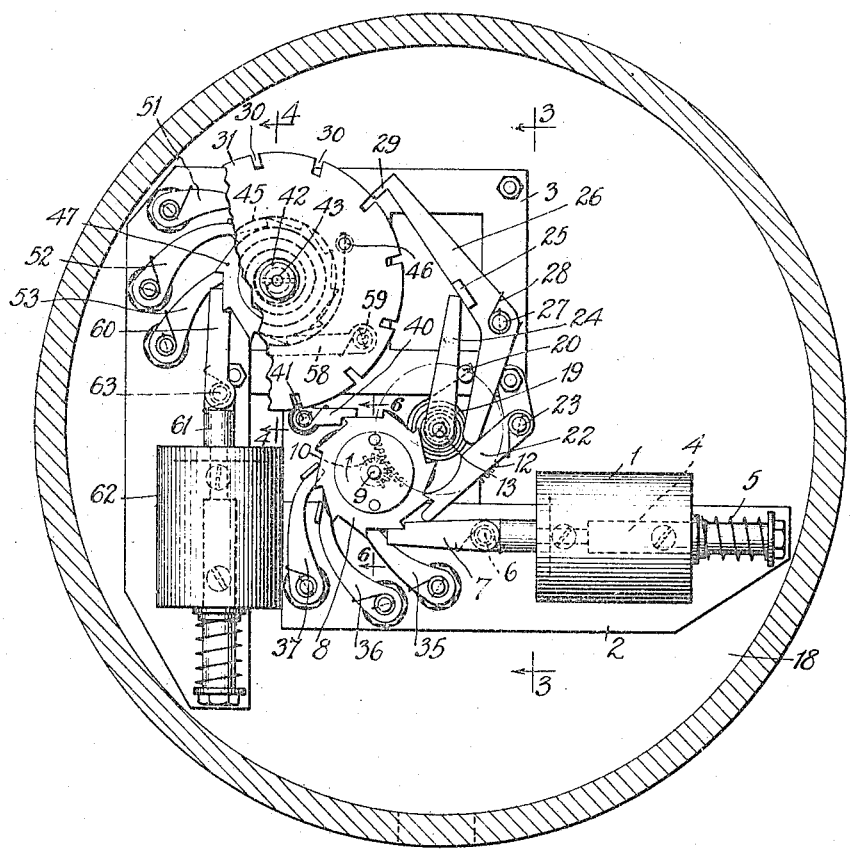
Figure 9:
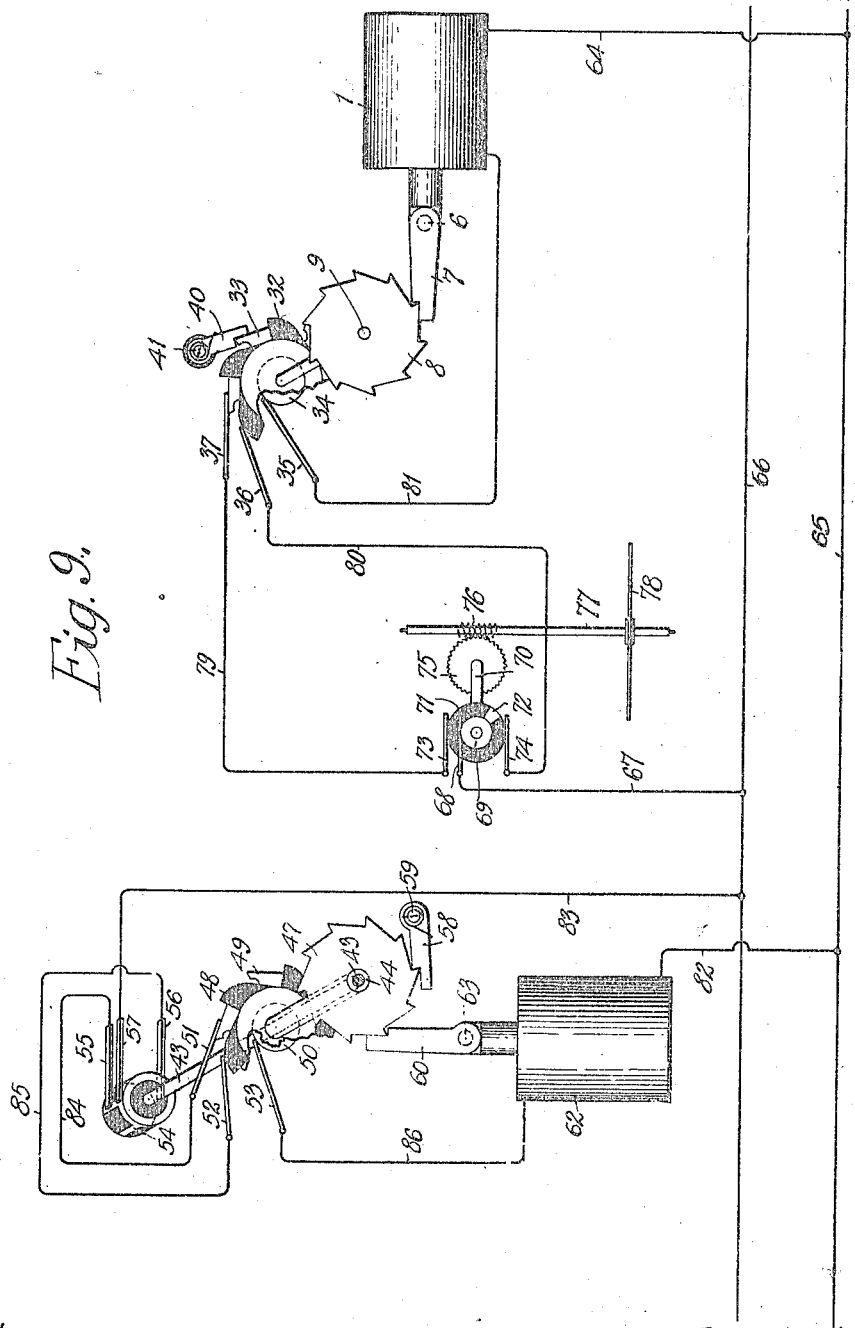

The several drawings illustrating my invention are as follows:

Figure 1 is a front view of the meter showing the pointer and operating mechanism at zero. Fig. 2 is a back view of the parts shown in Fig. 1 with the back of the casing removed to show the operating mechanism. Fig. 3 is a sectional view of the parts shown in Fig. 2 taken along the line 3—3. Fig. 4 is a sectional view of the parts shown in Fig. 2 taken along the line 4—4, which section is also indicated in Fig. 5. Fig. 5 is a sectional view of the parts shown in Fig. 4 taken along the line 5—5. Fig. 6 is a sectional view of the parts shown in Fig. 2 taken along the line 6—6. Fig. 7 is a sectional view of the parts shown in Fig. 3 taken along the line 7—7. Fig. 8 is a top view of the winding commutator. Fig. 9 is a diagrammatic view of the circuit connections employed in connection with indicating meter. Fig. 10 is a diagrammatic view illustrating the automatic winding mechanism for the clock train.

Similar numerals refer to similar parts throughout the several views.

As shown in Fig. 2, the solenoid 1 is mounted upon the base 2 secured to a framework 3 of clock-work mechanism employed to actuate the indicator. The core 4 of the solenoid is normally moved to the right by a spring 5 to the position indicated in Fig. 2 and at its left hand end it has pivoted to it at 6 a spring pawl 7 engaging a ratchet wheel 8 secured to the shaft 9. The shaft 9 as shown in Fig. 3 has secured to it a pinion 10 and a fan 11, such pinion meshing with a gear 12 secured to the shaft 13, to the right hand end of which as shown in Fig. 3, the arm 14 is secured. When the arm 14 is rotated to the right, it engages a pin 15 carried by the pointer 16, which pointer, as shown in Fig. 1, is supported by a tube 17 from the front wall 18 of the meter, so that the pointer 16 remains in the position to which it is moved by the arm 14 when the latter is returned to zero. Motion to the right of the arm 14 serves also to wind up the spring 19, one end of which is secured to the shaft 13, while the other end is secured to the post 20, extending back of the back plate of the casing. A spring retaining pawl 22 pivoted to the frame 3 at 23 is provided to hold the ratchet wheel 8 in the position to which it is advanced by the solenoid 1.

The rear end of the shaft 13 has secured thereto an arm 24 which, as the ratchet wheel 8 is moved in a clock-wise direction by the solenoid 1, is rotated in a counter clockwise direction, thus disengaging its upper end from a lug 25 carried by a lever 26 pivotally supported at 27 from the framework 3. The lower end of the lever 26 is pressed against the upper surface of the retaining pawl 22 by means of a spring 28, and the upper end of such lever has formed thereon a hook 29 adapted to engage one of the notches 30 in the disk 31 when such notch comes in alinement with the hook, after the arm 24 has been rotated to free the lug 25. The disk 31 is rotated continuously by suitable clock work in a manner to be described and when one of the notches 30 comes into alinement with the hook 29, as above referred to, the spring 28 rotates the lever 26 around to the left, thus moving the pawl 22 from engagement with the ratchet wheel 8 and at the same time the lower end of the pawl 22 engages the upper surface of the pawl 7 and removes it from engagement with the ratchet wheel 8, thus permitting the ratchet wheel, the shaft 13, and the arm 14 to be returned to zero position, at which time the arm 24 hits the post 20 after its upper end has engaged the lug 25 and thus rotated the lever 26 to the right to free the disk 31 and also permitting the pawls 7 and 22 to again engage the ratchet wheel 8.

The shaft 9 carries adjacent to the ratchet wheel 8, as shown in Figs. 3 and 6, an insulating disk 32 and a metallic disk 33, the latter being insulated from the shaft 9 and having formed near its center a cylindrical hub 34 to be engaged by spring contact 35. Each of the disks 32 and 33 has formed upon its periphery five teeth, the teeth of one disk being staggered relatively to the other and two spring contacts 36 and 37 are supported by the plate 2 as indicated in Fig. 2, so that their contact ends are substantially thirty-six degrees apart, and the contact ends of the contacts are so conformed that they extend over both of the disks 32 and 33, as a result of which, when one of such spring contacts rests upon the metal disk 33, the other rests upon the insulating disk 32 in a position out of contact with the metal disk as clearly indicated in Fig. 7. The disks 32 and 33 are rigidly held together in the relative position indicated in Fig. 7 and are mounted upon the shaft 9 so they may be rotated thereon, being advanced with such shaft by the operation of the solenoid 1 by means of the friction spring 38 secured to the shaft 9 by means of the set screw 39. A spring actuated retaining pawl 40 is pivoted at 41 to the frame 3 and is of a width to engage either of the disks 32 and 33 depending upon the position of such disks, as a result of which the spring contacts 36 and 37 remain in the positions indicated in Fig. 7 relatively to the disks 32 and 33, whether the shaft 9 be advanced by the action of the solenoid or returned to its initial position by the spring 19.

The disk 31 is secured to a hub 42 rigidly carried by the shaft 43, upon which the sleeve 44 is rotatably disposed. One end of a spring 45 is secured to the sleeve 44, while the other end is secured to the post 46 carried by the disk 31. The sleeve 46 also carries ratchet wheel 47, to which are secured the fiber disk 48 and a metal disk 49. The metal disk 49 is connected with a metal hub 50 and both are insulated from the ratchet wheel 47 and the shaft 43. The disks 48 and 49 and hub 50 are similar in their construction and function to the disks 32 and 33 and the hub 34 described above, and are engaged as indicated in Fig. 5 by the spring contacts 51, 52 and 53. The spring 53 rests upon the hub 50, while the springs 51 and 52 rest upon the teeth formed upon the disk 48 and 49 as described above in connection with Fig. 7 for disks 32 and 33. The commutator 54 is rigidly secured to the shaft 43, as indicated in Figs. 4, 5 and 8, such commutator having five sections separated by insulation as indicated in Fig. 8, upon which oppositely disposed springs 55 and 56 are disposed to rest while a third spring 57 is disposed over a continuous connecting ring of metal secured to one end of the commutator segments. A retaining pawl 58 pivoted to the frame 3 at 59 is provided to hold the ratchet wheel 47 in the position to which it may be moved by means of the pawl 60 pivoted to the plunger 61 of the solenoid 62 at 63. The solenoid 62 is carried by the framework of the instrument as indicated and is similar in its construction to the solenoid 1.

The shaft 43 is connected with a suitable clock train, which being well known in the art, is not here shown in detail. The clock train thus used, by the operation of the spring 45, causes the shaft 43 to complete a rotation in an hour, as a result of which one of the contact springs 55 and 56 is brought into connection with the contact spring 57 once every six minutes, and since there are twelve of the notches 30 in the edge of the disk 31, the shaft 9 will be released once every five minutes, that is, the arm 14 will be advanced during successive five minute intervals, being returned to zero at the beginning of each interval and the pointer 16 will be moved to the maximum position assumed by the arm 14.

As shown in Fig. 9, the parts described above are related to electrical circuits for controlling their operation as follows: The solenoid 1 has one of its terminals connected by wire 64 with one conductor 65 of a suitable supply circuit, the other conductor 66 of which is connected by a wire 67 with the contact 68 bearing upon a contact cylinder 69 secured to the shaft 70. The shaft 70 also carries an insulating disk 71 in which a contact section 72 is inserted, such section being in electrical contact with the cylinder 69. Brushes 73 and 74 rest upon opposite sides of the disk 71. The shaft 70 has also secured to it a gear 75 which is in mesh with a worm 76 carried by the shaft 77 of the integrating watt meter, with which the apparatus is to be used. The shaft 77 also carries a retarding disk 78 for a purpose well known in the art, which is not here described in detail. The brushes 73 and 74 are connected by wires 79 and 80 with the spring contacts 37 and 36 respectively, which contacts have been described above. The contact 35 is connected by wire 81 with the other terminal of the solenoid 1.

As a result of the circuit connections described, when the shaft 70 is rotated by watt meter shaft 77 so that the contact sections 72 engages the brush 73, a circuit is closed as follows: supply wire 66, wire 67, spring 68, contact cylinder 69, contact 72, contact 73, wire 79, contact 37, disk 33, cylinder 34, contact 35, wire 81, solenoid 1, wire 64 to the other supply wire 65. The solenoid 1 is thus energized and rotates the ratchet wheel 8 and parts carried thereby one-tenth of a rotation, thus bringing the contact 37 upon an insulating tooth of the disk 32 and the brush 36 into contact with one of the teeth of the metal disk 33, which interrupts the energizing circuit just traced. This condition of the apparatus is maintained until the contact section 72 is rotated into engagement with the contact spring 74, for which condition a second energizing circuit is closed identical with the first except that the current flows from the section 72 through spring 74, wire 80, contact 36 to the disk 33 instead of the path above traced. This again causes energization of the solenoid 1, which advances the ratchet wheel 8 one-tenth of a rotation, thus again bringing the contact 37 into engagement with the disk 33 and the contact 36 into engagement with the disk 32. Thus for each operation of the solenoid 1, the circuit by which it is energized is interrupted, while the contact section 72 is still in engagement with the corresponding contact 73 or 74, and from the construction of the parts it will be seen that the break in the circuit is quick, thus reducing the burning on the points of the teeth of the disk 33 to a minimum. A comparatively wide gap is maintained between the points of the teeth of the disk 33 and the contacts 36 and 37 by means of the retaining pawl 40 described above, which prevents back rotation of the disks 32 and 33 when the shaft 9 and parts rigidly secured thereto are returned to their zero position upon the withdrawal of the pawls 7 and 22.

The solenoid 62 has one of its terminals connected by wire 82 with the supply wire 65, while the other supply wire is connected by wire 83 with the contact spring 57 bearing upon the commutator 54. The springs 55 and 56 are connected by wires 84 and 85 with the contacts 51 and 52 respectively, while the contact 53 is connected by wire 86 with the other terminal of the solenoid 62.

As a result of the connections just described, when the commutator 54 is rotated to the position indicated in Fig. 9, a circuit is closed as follows: supply conductor 65, wire 82, solenoid 62, wire 86, contact 53, contact cylinder 50, disk 49, contact 51, wire 84, contact 55, commutator 54, contact 57, wire 83, to the other supply wire 66. As a result of the current flow thus set up, the solenoid 62 is energized and rotates the sleeve 44 and parts carried thereby one-tenth of a rotation, thus winding the spring 45 a corresponding amount, and when thus advanced, the ratchet wheel 47 is engaged by the retaining pawl 58 and prevented from back rotation. This advance moves the disk 49 from engagement with the contact 51 and brings such contact into engagement with the disk 48, while the latter disk is removed from engagement with the contact 52 thus permitting the latter contact to come into engagement with the disk 49, as a result of which, when the commutator 54 is rotated to bring the brush 56 into engagement with one of the conducting sections of such commutator, a second energizing circuit is closed identical with the one just traced with the exception that the current now flows from the disk 49 through the contact 52, wire 85, contact 56, to the commutator 54 instead of following the path above traced. This results in a second energization of the solenoid 62, which again advances the sleeve 44 and brings the contacts 51 and 52 again into the relation relatively to the disks 48 and 49 that they occupy in Fig. 9. The shaft 43, as shown diagrammatically in Fig. 10, has secured to it a gear 100 which drives the gear train 101 and thus, in turn, the escapement 102, which parts are so proportioned that the rotation described above of the disk 31 is secured. In this figure, the relations between the sleeve 46, the spring 45, the disk 31 and the solenoid 62, together with the pawl 60 operated thereby, to rotate the ratchet wheel 47 to rotate the sleeve 46 to wind the spring, are clearly shown.

Thus the clock mechanism is automatically wound a small amount at regularly recurring intervals, which may be of any duration desired by properly constructing the commutator 54, although for purposes of illustration six minute intervals are secured in the present embodiment of my invention.

It is further to be understood that while the disk 31 is provided in the drawings with twelve notches 30, that any desired number may be employed, as a result of which the successive intervals during which the pointer 16 is advanced may be given any desired length. It is further to be noted that since the pointer 16 is advanced only by the maximum energy measured during any one of the pre-determined intervals, when such energy is the greatest amount used in any of such intervals, the pointer 16 will not measure the instantaneous value of the maximum peak of the energy consumption if such maximum continue but for a very brief interval since the time element involved in connection with the use of such energy is represented in the advance of the arm 14 as a result of the operation of the watt meter shaft 77, and thus the apparatus may be termed an average peak indicating mechanism.

While I have shown my invention in connection with an integrating watt meter, it is to be understood that it is equally applicable for indicating the maximum amount of rotation during any one of recurring intervals of the shaft 77, whether such shaft be driven by the means described or not, the essential thing being that the device controlling the actuation of the mechanism for advancing the maximum indicator shall have a cyclic motion, the maximum amount of which during any particular interval is to be ascertained. Furthermore it will be understood that while I have shown the particular devices indicated for the purpose of advancing the maximum indicator during recurring intervals, I do not limit myself to such devices, but may employ any equivalent, mechanical or electrical in connection with time controlled mechanism which in any case accurately determines the recurring intervals. I do not therefore limit myself to the constructions disclosed herein, but desire to claim any equivalent that may suggest itself to those skilled in the art.

What I claim is:

1. In a maximum demand meter, the combination of indicating means, devices for advancing the indicating means by a step by step movement, electromagnetic mechanism for actuating such devices, integrating mechanism controlling the operation of such electromagnetic mechanism, and circuit breaking mechanism controlled by the electromagnetic mechanism to break the energizing circuit by the operation of such mechanism.

2. In a maximum demand meter, the combination of a pointer for indicating the maximum quantity of electrical energy used during a pre-determined interval, an arm independent of the pointer for advancing the same, a ratchet wheel for driving such arm, an operating pawl for the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, and circuit breaking devices in the circuit driven by the ratchet wheel.

3. In a maximum demand meter, the combination of a pointer for indicating the maximum quantity of electrical energy used during a pre-determined interval, an arm independent of the pointer for advancing the same, a ratchet wheel for driving such arm, an operating pawl for the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, circuit breaking devices in the circuit driven by the ratchet wheel, and means for periodically returning the ratchet wheel and parts carried thereby to their initial position.

4. In a maximum demand meter, the combination of a pointer for indicating the maximum quantity of electrical energy used during a pre-determined interval, an arm independent of the pointer for advancing the same, a ratchet wheel for driving such arm, an operating pawl for the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, circuit breaking devices in the circuit driven by the ratchet wheel, means for periodically returning the ratchet wheel and parts carried thereby to their initial position without changing the position of the circuit breaking devices.

5. In a maximum demand meter, the combination of a pointer for indicating the maximum quantity of electrical energy used during a pre-determined interval, an arm independent of the pointer for advancing the same, a ratchet wheel for driving such arm, an operating pawl for the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, circuit breaking devices in the circuit driven by the ratchet wheel, means for disengaging the pawls from the ratchet wheel, and a spring for returning the ratchet wheel and the parts carried thereby to their initial position when such pawls are disengaged from the ratchet wheel.

6. In a maximum demand meter, the combination of a pointer for indicating the maximum quantity of electrical energy used during a pre-determined interval, an arm independent of the pointer for advancing the same, a ratchet wheel for driving such arm, an operating pawl for the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, circuit breaking devices in the circuit driven by the ratchet wheel, a time controlled shaft and devices operated by such shaft for periodically causing the return of such arm to its initial position.

7. In a maximum demand meter, the combination of a pointer for indicating the maximum quantity of electrical energy used during a pre-determined interval, an arm independent of the pointer for advancing the same, a ratchet wheel for driving such arm, an operating pawl for the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, circuit breaking devices in the circuit driven by the ratchet wheel, a time controlled shaft, a notched disk carried by such shaft, and a lever coöperating with such disk and adapted to disengage the pawls from the ratchet wheel when such lever engages one of such notches, a spring connected with the ratchet wheel and adapted to return such parts to their initial position when thus released from the pawls, and a second arm driven by such spring to remove the lever from the notch when the ratchet wheel reaches its initial position whereby the pawls are again permitted to engage the ratchet wheel.

8. In a maximum demand meter, the combination of a pointer for indicating the maximum quantity of electrical energy used during a pre-determined interval, an arm independent of the pointer for advancing the same, a ratchet wheel connected with such arm, an operating pawl associated with the ratchet wheel, electromagnetic mechanism for driving the operating pawl, a retaining pawl, integrating mechanism for measuring the electrical energy, a commutator driven by the integrating mechanism, an energizing circuit extending from the commutator to the electromagnetic mechanism, circuit breaking devices in the circuit driven by the ratchet wheel, a time controlled shaft, devices operated by such shaft for periodically causing the return of such arm to its initial position, a second commutator driven by such shaft, a spring for driving the shaft, electromagnetic mechanism for periodically winding the spring, a second circuit extending from the second commutator to the winding electromagnetic mechanism, and circuit breaking devices in the winding circuit actuated to break the circuit by the winding operation.

9. In a maximum demand meter, the combination of means for indicating the amount of electrical energy flowing through a circuit during any one of pre-determined intervals, time controlled mechanism for determining such intervals, a spring for driving such time controlled mechanism, electromagnetic mechanism for periodically winding the spring, a commutator driven by the time controlled mechanism, a circuit extending from the commutator to the electromagnetic mechanism, and circuit breaking device in such circuit for interrupting the same by the actuation of the electromagnetic mechanism.

In witness whereof, I hereunto subscribe my name this 28 day of February, A. D., 1911.

CHESTER I. HALL.

Witnesses:
H. S. SIMS,
C. C. LOVEJOY.